(12) United States Patent
Itomi (10) Patent No.: US 8,151,959 B2
(45) Date of Patent: Apr. 10, 2012

(54) ONE-WAY CLUTCH UNIT

(75) Inventor: Shoji Itomi, Kuwana (JP)

(73) Assignee: NTN Corporation, Osaka (JP)

( * ) Notice: Subject to any disclaimer, the term of this patent is extended or adjusted under 35 U.S.C. 154(b) by 641 days.

(21) Appl. No.: 12/308,864

(22) PCT Filed: Jun. 28, 2007

(86) PCT No.: PCT/JP2007/062988
§ 371 (c)(1),
(2), (4) Date: Dec. 24, 2008

(87) PCT Pub. No.: WO2008/001842
PCT Pub. Date: Jan. 3, 2008

(65) Prior Publication Data
US 2009/0223768 A1   Sep. 10, 2009

(30) Foreign Application Priority Data

Jun. 30, 2006 (JP) ................................. 2006-181439

(51) Int. Cl.
*F16D 41/02* (2006.01)
*F16D 41/08* (2006.01)
(52) U.S. Cl. ........................................... 192/45; 192/47
(58) Field of Classification Search .................... 192/44, 192/45, 47; 188/82.3, 82.84
See application file for complete search history.

(56) References Cited

U.S. PATENT DOCUMENTS

| | | | |
|---|---|---|---|
| 6,019,301 A * | 2/2000 | Hitomi | 242/247 |
| 6,481,656 B2 * | 11/2002 | Jeong | 242/247 |
| 6,543,592 B2 * | 4/2003 | Hori | 192/45 |
| 6,920,969 B2 * | 7/2005 | Ishizaka et al. | 192/45 |
| 2006/0289264 A1 * | 12/2006 | Zhong | 192/48.92 |

FOREIGN PATENT DOCUMENTS

| | | |
|---|---|---|
| JP | 10-238560 | 9/1998 |
| JP | 2002-085468 | 3/2002 |
| JP | 2004-011784 | 1/2004 |
| JP | 2004011784 A * | 1/2004 |

OTHER PUBLICATIONS

International Search Report issued Jul. 31, 2007 in the International (PCT) Application of which the present application is the U.S. National Stage.

* cited by examiner

*Primary Examiner* — David D Le
*Assistant Examiner* — Jude Agendia
(74) *Attorney, Agent, or Firm* — Wenderoth, Lind & Ponack, L.L.P.

(57) ABSTRACT

A one-way clutch unit includes a one-way clutch and an unlocking member. The one-way clutch includes inner and outer races. Two pockets having wedge spaces having a wedge angle are formed between the inner and outer races. Several rolling elements are received in each pocket. The unlocking member includes an annular portion concentric with the inner race, and axially extending unlocking pieces each received in one of the pockets between the end of the pocket that faces the narrow ends of the wedge spaces having the wedge angle and the rolling elements. By externally actuating the unlocking member, the rolling elements are moved toward the wide ends of the respective wedge space having the wedge angle, thereby unlocking the clutch. Thus, it is possible to unlock the clutch and prevent transmission of torque to the output member while the input member is rotating in the forward direction.

7 Claims, 8 Drawing Sheets

ONE-WAY CLUTCH UNIT

TECHNICAL FIELD

This invention relates to a one-way clutch unit having an unlocking function and a one-way clutch unit having an unlocking and reverse rotation function, both clutch units being used in a field where it is necessary to selectively transmit and not transmit rotation.

BACKGROUND ART

A typical one-way clutch used e.g. in a paper feeder of an office machine is disclosed in JP Patent publication 10-238560A (FIGS. 1 and 2), which includes an outer race rotatably mounted around a rotary shaft. A plurality of circumferentially spaced pockets are formed in the radially inner surface of the outer race. On the bottom of each pocket, a cam surface is formed which defines a wedge space having a predetermined wedge angle in cooperation with the outer periphery of the rotary shaft. In each pocket, a rolling element and a biasing spring biasing the rolling element toward the narrow end of the wedge space are received.

In this one-way clutch, when the rotary shaft rotates toward the narrow end of each wedge space, the rolling elements are wedged into the respective wedge spaces. The outer race and the rotary shaft are thus locked together and rotate together. When the rotary shaft rotates in the opposite direction, the rolling elements become disengaged from the respective wedge spaces, allowing the rotary shaft to rotate alone in the opposite direction.

This one-way clutch is used with the rotary shaft as an input and the outer race as an output. Conversely, the one-way clutch may be used with the outer race as an input and the rotary shaft as an output. If this one-way clutch is structured so that when the input member rotates in the forward direction, the clutch is locked, and in order to unlock the clutch, the rotary shaft has to be rotated in the reverse direction.

But according to the intended use, it may be necessary to unlock the clutch while the input member is rotating in the forward direction, thereby preventing transmission of rotation to the output member. On other occasions, it may be necessary to not only unlock the clutch but simultaneously rotate the output member in the reverse while the input member is rotating in the forward direction. The above-mentioned conventional one-way clutch, which can be unlocked only by rotating the rotary shaft, cannot meet these requirements. If larger maximum permissible torque is required for this type of conventional one-way clutch, it is necessary to increase the number of rolling elements and thus to correspondingly increase the outer diameter of the one-way clutch.

Use of an electromagnetic clutch would make it possible to prevent transmission of torque to the output member and simultaneously rotate the output member in the reverse direction while the input member is rotating in the forward direction. But an electromagnetic clutch further needs a commercial power source or a battery and corresponding wiring extending through the complicated device.

SUMMARY OF THE INVENTION

An object of the present invention is to provide a one-way clutch unit comprising a one-way clutch as described above and a mechanical unlocking mechanism capable of unlocking the clutch while the input member is rotating, and a one-way clutch unit having such an unlocking function and also a reverse rotation function, and to increase the maximum permissible torque of these one-way clutch units without increasing their outer diameter.

Figure 1:
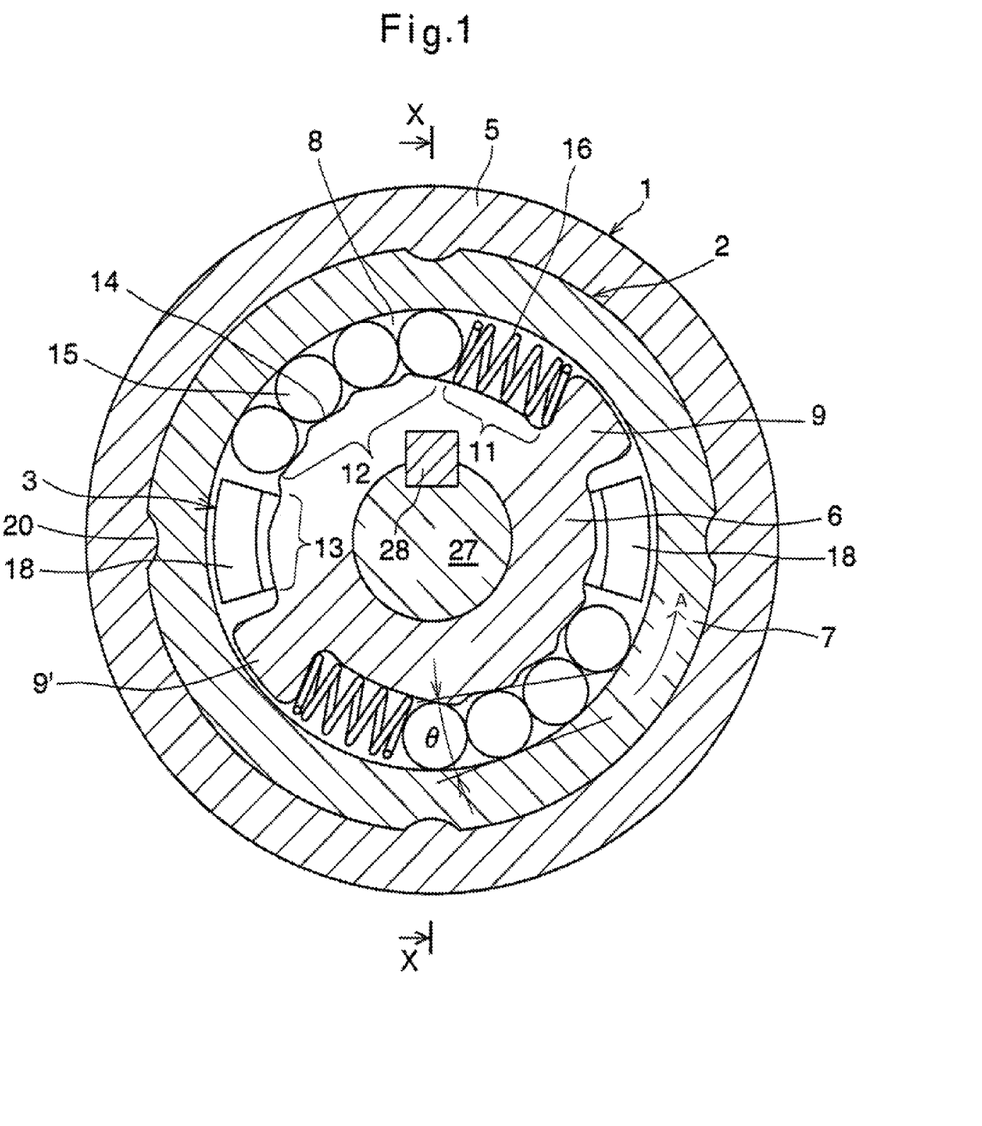
FIG. 1 is a vertical sectional front view of Embodiment 1.
Figure 2:
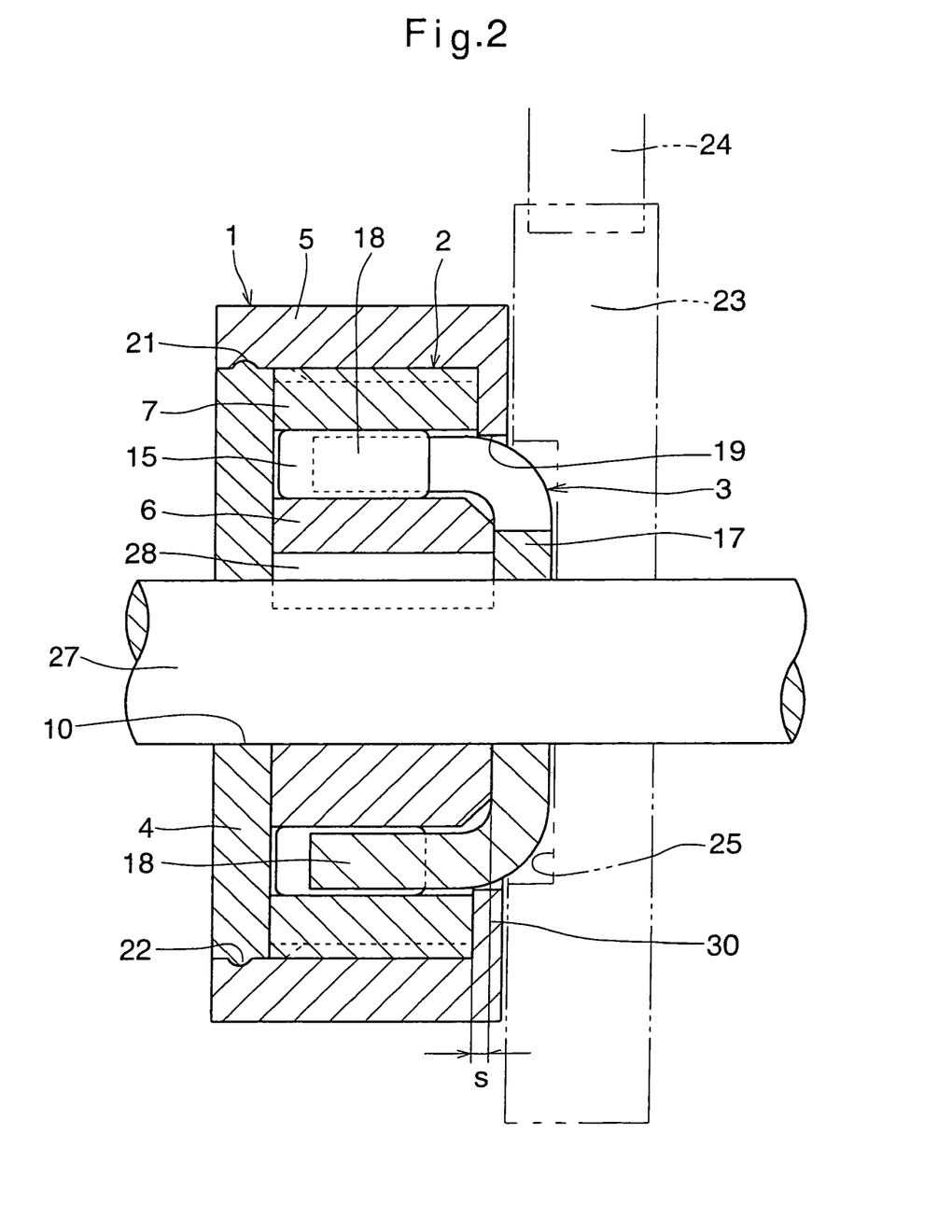
FIG. 2 is a sectional view taken along line X-X of FIG. 1.
Figure 3:
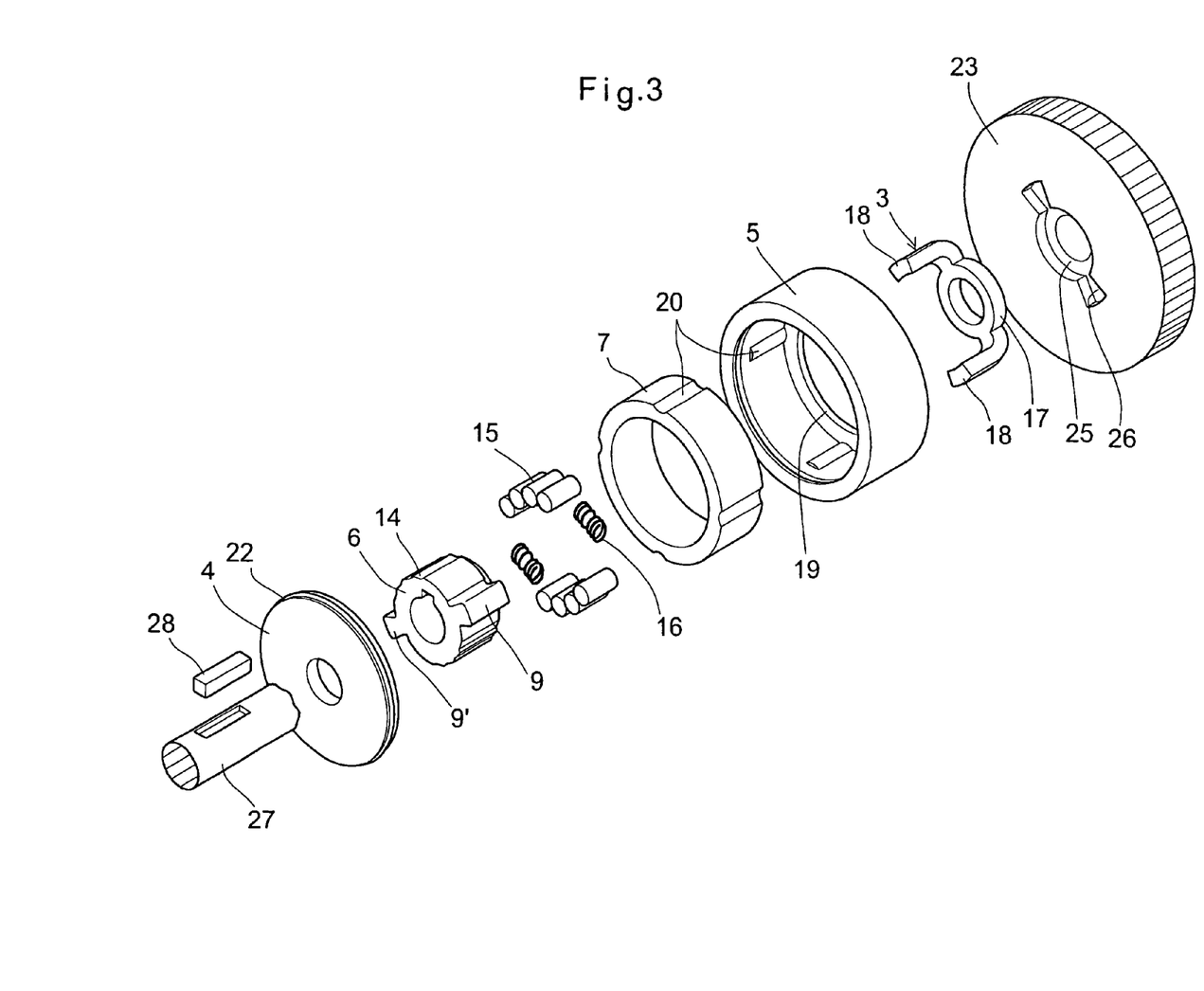
FIG. 3 is an exploded perspective view of Embodiment 1.

In order to achieve this object, as shown in FIGS. 1 to 3, the present invention starts from a one-way clutch unit having an unlocking function and comprises a one-way clutch 2 and an unlocking member 3, the one-way clutch 2 comprising an inner race 6, an outer race 7 fitted around the inner race so as to be rotatable relative to the inner race, one of the inner and outer races 6 and 7 having a plurality of circumferentially spaced pockets 8 formed in a fitting surface thereof, each of the pockets having a bottom formed with a circumferentially inclined cam surface 14 defining a wedge space having a predetermined wedge angle $\theta$ in cooperation with a fitting surface of the other of the inner and outer races 6 and 7, rolling elements 15 each disposed on the cam surface 14 of one of the pockets, and biasing springs 16 each received in one of the pockets 8 between a first end of the pocket that faces a wide end of the wedge space having the predetermined wedge angle $\theta$ and the rolling element 15 and biasing the rolling element 15 toward a narrow end of the wedge spaces having the predetermined wedge angle $\theta$.

In this arrangement, the one-way clutch unit according to the present invention is characterized in that each of the pockets 8 has a plurality of the cam surfaces 14 that are formed continuously in the circumferential direction, that in each of the plurality of pockets 8, a plurality of the rolling elements 15 are received so as to be each disposed on one of the cam surfaces 14 and in contact with each other, and that the unlocking member 3 comprises an annular portion 17 that is concentric with the inner race 6 or outer race 7, and axially extending unlocking pieces 18 each received in one of the pockets 8 between a second end of the pocket 8 that faces the narrow ends of the wedge spaces having the predetermined wedge angle $\theta$ and the rolling elements 15 located nearest to the second end.

This one-way clutch unit having an unlocking function is used with one of the inner and outer races 6 and 7 as an input and the other as an output and with a suitable control member in engagement with the unlocking member 3. While the control member is in a forward rotation mode, the unlocking member 3 is in a neutral position. Thus, when the input member is rotated in a forward direction A (direction in which the one-way clutch 2 is locked), the one-way clutch 2 is locked, and the forward rotation A is transmitted to the output member. When the forward rotation mode is switched over to a stop mode, the unlocking member 3 stops, thus unlocking the one-way clutch 2, so that the rotation is now prevented from being transmitted to the output member.

In the conventional type one-way clutch (JP Patent publication 10-238560A (FIGS. 1 and 2)), because only one rolling element is received in each pocket, if this one-way clutch is used in combination with an unlocking member, it is necessary to insert the unlocking pieces each into one of the pockets. Thus, if the outer diameter is the same, the numbers of pockets and rolling elements decrease by using the unlocking member. In contrast, with the above-described arrangement of the present invention, since a plurality of rolling elements are received in each pocket, if the number of rolling elements is the same, the number of pockets and thus the number of unlocking pieces decrease. Thus, it is possible to increase the number of rolling elements 15 compared to the abovementioned conventional arrangement.

This one-way clutch unit may further comprise a control member 23 which axially faces the one-way clutch 2 so as to be coaxial with and rotatable relative to the one-way clutch 2, with the annular portion 17 of the unlocking member 3 in engagement with a surface of the control member 23 facing the one-way clutch so as to be rotatable together with the control member 23. With this arrangement, it is possible to assemble the one-way clutch unit and the control member 23 as a single modular unit. By mounting this molar unit in a casing 5, it can be handled more easily. In this case, the casing 5 may have a closed end 30 formed with a central opening 19 through which the annular portion 17 of the unlocking member 3 protrudes outwardly, and an open end in which a lid 4 formed with a shaft hole 10 is fitted.

Figure 5:
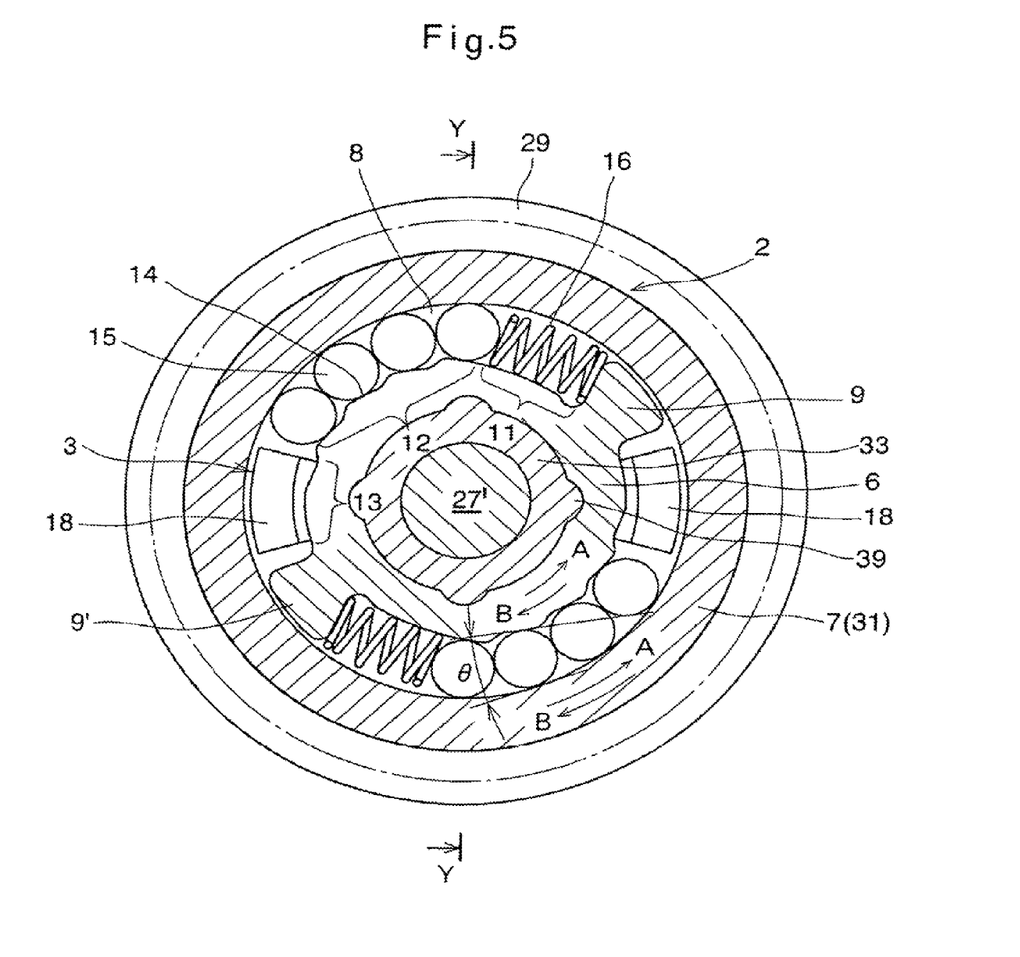
FIG. 5 is a vertical sectional front view of Embodiment 2.
Figure 6:
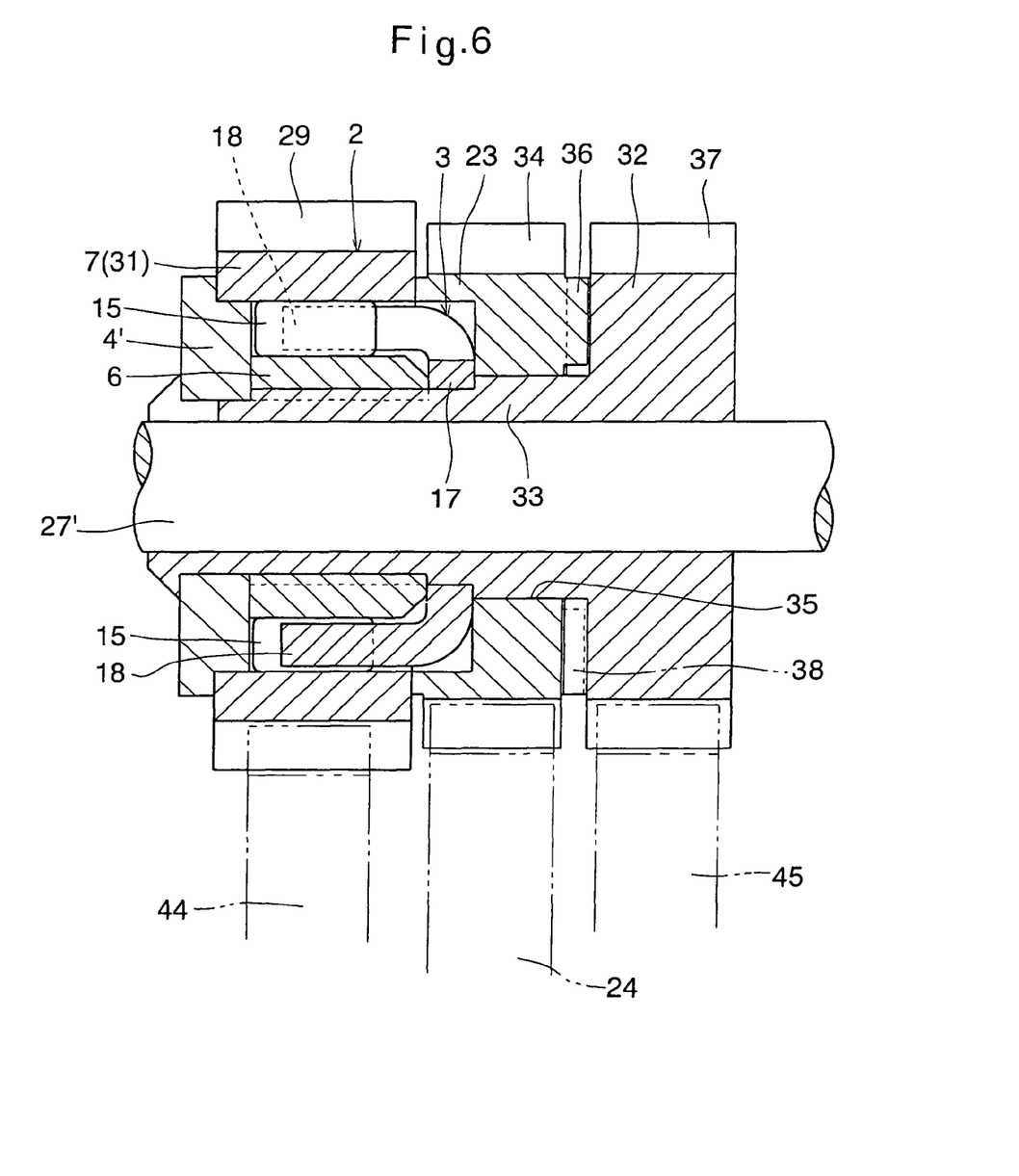
FIG. 6 is a sectional view taken along line Y-Y of FIG. 5.
Figures 7A, 7B, 7C:
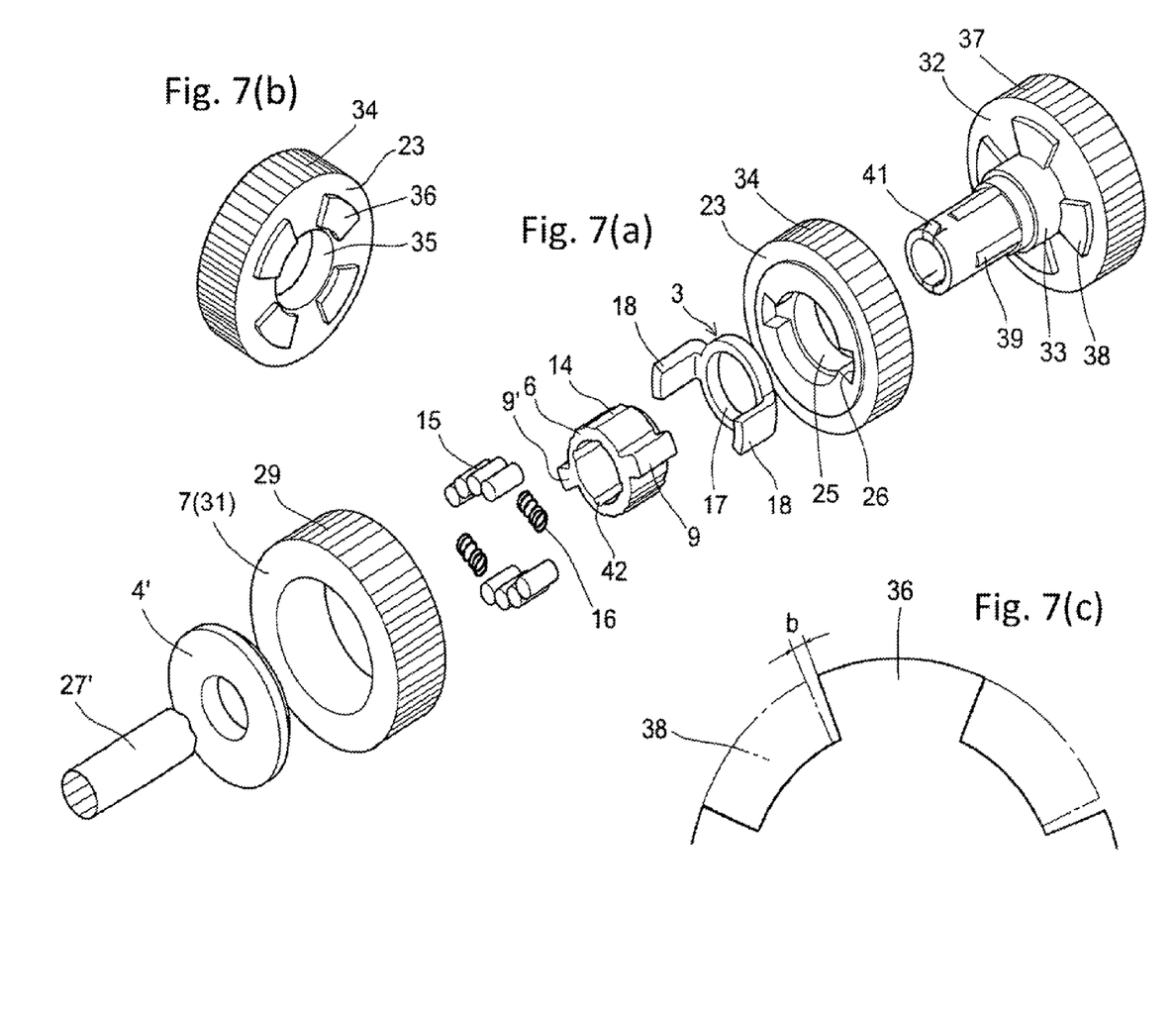
FIG. 7(a) is an exploded perspective view of Embodiment 2.
FIG. 7(b) is a perspective view of a control member of Embodiment 2.
FIG. 7(c) is a partial front view of rotation transmission portions of Embodiment 2.

From another aspect of the invention, the present invention provides a one-way clutch unit having an unlocking and reverse rotation function. As shown in FIGS. 5 to 7, this clutch unit comprises a one-way clutch 2, an unlocking member 3, an input member 31, an output member 32 and a control member 23 that are coaxially assembled together. The one-way clutch 2, and the unlocking member 3 and the control member 23, which are combined with the clutch 2, are identical in structure to those of the above-mentioned one-way clutch unit having an unlocking function. Besides, the input member 31 and the output member 32 are fixed to the outer race 7 and the inner race 6 of the one-way clutch 2, respectively, and the control member 23 and the output member 32 have rotation transmission portions 36 and 38 that are in engagement with each other, thereby rotationally fixing the control member 23 and output member 32 together.

In the one-way clutch unit having an unlocking and reverse rotation function, torque is applied to the outer race 7 of the one-way clutch 2 through the input member 31. During the forward rotation mode, the control member 23 rotates in the forward direction A, and the one-way clutch 2 is locked. Thus, the forward rotation is transmitted through the inner race 6 to the output member 32, so that the output member 32 is rotated in the forward direction. During the reverse rotation mode, the control member 23 is rotated in the reverse direction, while the one-way clutch 2 is unlocked. Thus, the output member 32, which is coupled to the control member 23 through the rotation transmission portions 36 and 38, are rotated in the reverse direction.

In the one-way clutch unit having an unlocking function according to this invention, by externally actuating the mechanically combined unlocking member, the one-way clutch is unlocked, so that it is possible to stop the output member while the input member is rotating in the forward direction. Because a plurality of rolling elements are received in each pocket, it is possible to increase the number of rolling elements and thus the maximum permissible torque, without increasing the outer diameter of the one-way clutch.

In the one-way clutch unit having an unlocking and reverse rotation function according to this invention, it is possible to selectively stop the output member and rotate the output member in the reverse direction while the input member is rotating in the forward direction, by mechanical means without using any electric facility. Maximum permissible torque also increases for the same reason as above.

DETAILED DESCRIPTION OF THE INVENTION

The embodiments are now described with reference to the attached drawings.

Embodiment 1

FIGS. 1 to 4 show a one-way clutch unit 1 according to Embodiment 1, which comprises a one-way clutch 2 and an unlocking member 3 (see FIG. 2), which are received in a casing 5 having a lid 4.

The one-way clutch 2 includes an inner race 6 and an outer race 7 rotatably mounted around the inner race 6. In the radially outer surface of the inner race 6, which radially faces the outer race 7, two pockets 8 are formed which are symmetrical to each other with respect to the center of the clutch 2. The pockets 8 are circumferentially wide ones having a central angle of about 160° and each having a radially outer opening. The pockets 8 define a pair of pillars 9 and 9' therebetween that are symmetrical to each other with respect to the center of the clutch 2. The pockets 8 are open at both axial ends thereof to the respective end surfaces of the inner race 6 (FIG. 2).

Each pocket 8 comprises three substantially circumferentially equally divided sections which are, from one of the pillars 9 and 9' toward the other pillar, a spring receiving section 11, a rolling element receiving section 12 and an unlocking piece inserting section 13. Four cam surfaces 14 are continuously formed on the bottom of the rolling element receiving section 12. Four rolling elements 15 (rollers in the embodiment) are received in the section 12 each on one of the cam surfaces 14. The four rolling elements 15 are in contact with each other while kept in contact with the respective cam surfaces 14 and the radially inner surface of the outer race 7. The tangent line between each rolling element 15 and the radially inner surface of the outer race 7 forms a wedge angle θ with the corresponding cam surface 14. The angle θ is determined such that the cam surfaces 14 incline obliquely radially outwardly in the forward direction A (shown by the arrow A in FIG. 1) which is the direction in which the inner and outer races rotate, thereby locking the one-way clutch 2.

A compression coil spring 16 is received in the coil receiving section 11 of each pocket 8 so as to be disposed between the abovementioned one of the pillars 9 and 9' (which faces the wide ends of the wedge spaces having the wedge angle θ) and one of the four rolling elements 15 provided nearest to this end. The spring 16 thus biases the four rolling elements 15, which are in contact with each other, toward the narrow ends of the respective wedge spaces, thereby stabilizing the attitudes of the rolling elements 15. The coil springs 16 are used so that the springs can withstand large loads applied from the rolling elements 15 when the clutch is unlocked. But if loads applied from the rolling elements 15 are relatively low, V-shaped leaf springs used in conventional one-way clutches of this type may be used instead.

The unlocking member 3 comprises an annular portion 17 and a pair of unlocking pieces 18 formed on the outer periphery of the annular portion 17 so as to be symmetrical to each other and bent in the axial direction. The unlocking pieces 18 of the unlocking member 3 are inserted in the unlocking piece inserting sections 13 of the respective pockets 8 in the axial direction. As shown in FIG. 1, predetermined gaps exist between each unlocking piece 19 and the rolling elements 15 and between each unlocking piece 19 and the abovementioned other pillar 9' or 9 (which faces the narrow ends of the wedge spaces having the wedge angle θ). As shown in FIG. 2, the annular portion 17 is held in position so as to be concentric with the inner race 6 and the outer race 7 while slightly protruding axially from the end surface of the outer race 7. In order to closely press the end surface of the inner race 6 against the annular portion 17, the end surface of the inner race 6 protrudes axially from the end surface of the outer race 7 by a distance s.

The one-way clutch 2 comprises the inner race 6, outer race 7, rolling elements 15 and coil springs 16. The one-way clutch 2 is received in the casing 5 with the unlocking member 3 coupled to the clutch 2. In this state, by closing the open end of the casing 5 with the lid 4, the one-way clutch unit 1 is assembled. The clutch unit 1 includes a rotation preventive arrangement 20 comprising axial engaging grooves formed in one of the radially inner surface of the casing 5 and the outer race 7, and axial ribs formed in the other and engaged in the respective engaging grooves. The casing 5 has an end wall 30 having a central opening 19 through which the annular portion 17 of the unlocking member 3 is exposed to outside. An engaging groove 21 is formed in the inner periphery of the casing 5 at its open end portion, in which an engaging rib 22 formed on the lid 4 is engaged. The lid 4 is formed with a shaft hole 10. With the clutch unit assembled, the shaft hole 10, the inner race 6 and the unlocking member 3 are coaxial with each other.

The annular portion 17 is exposed to outside of the casing 5 in order to bring the annular portion 17 into engagement with an external control member 23. The control member 23 is a gear rotated by a control mechanism 24. The control member 23 is formed with an engaging recess 25 (see FIG. 3) in its inner surface in which the annular portion 17 of the unlocking member 3 engages, thereby preventing separation of the unlocking member 3. The control member 23 further includes engaging portions 26 formed in the inner periphery of the engaging recess 25 and in engagement with the bent portions of the respective unlocking pieces 18 of the unlocking member 3, thereby rotationally fixing the unlocking member 3 to the control member 23. During use, a rotary shaft 27 is inserted through the lid 4, inner race 6, unlocking member 3 and control member 23 and rotationally fixed to these members by means of a key 28 (see FIGS. 1 and 4) disposed between the shaft 27 and the inner race 6.

Having described the structure of the one-way clutch unit 1, which has the unlocking function, its operation is now described.

As shown in FIG. 2, the one-way clutch unit 1 having the unlocking function is used with the annular portion 17 of the unlocking member 3 engaged in the engaging recess 25 formed in the control member 23 (in the form of a gear) of the external device. The control member 23 is controlled by the control mechanism 24, which has control modes comprising a forward rotation mode and a stop mode. During the forward rotation mode, the control member 23 rotates such that the unlocking pieces 18 of the unlocking member 3 are held in a neutral position shown in FIG. 1 (in which the respective unlocking pieces 18 are in contact with neither the rolling elements 15 nor the pillars 9 and 9'). During the stop mode, the control member 23 stops.

During the forward rotation mode, when the outer race 7 and the casing 5 rotate in the forward direction (shown by the arrow A in FIG. 1), the rolling elements 15 wedge into the respective wedge spaces having the wedge angle θ all at once, thus locking the clutch. As a result, the entire one-way clutch unit 1 rotates in the forward direction together with the rotary shaft 27. Simultaneously, the control member 23, which is in the neutral position while in engagement with the unlocking member 3, also rotates in the forward direction.

Figure 4:
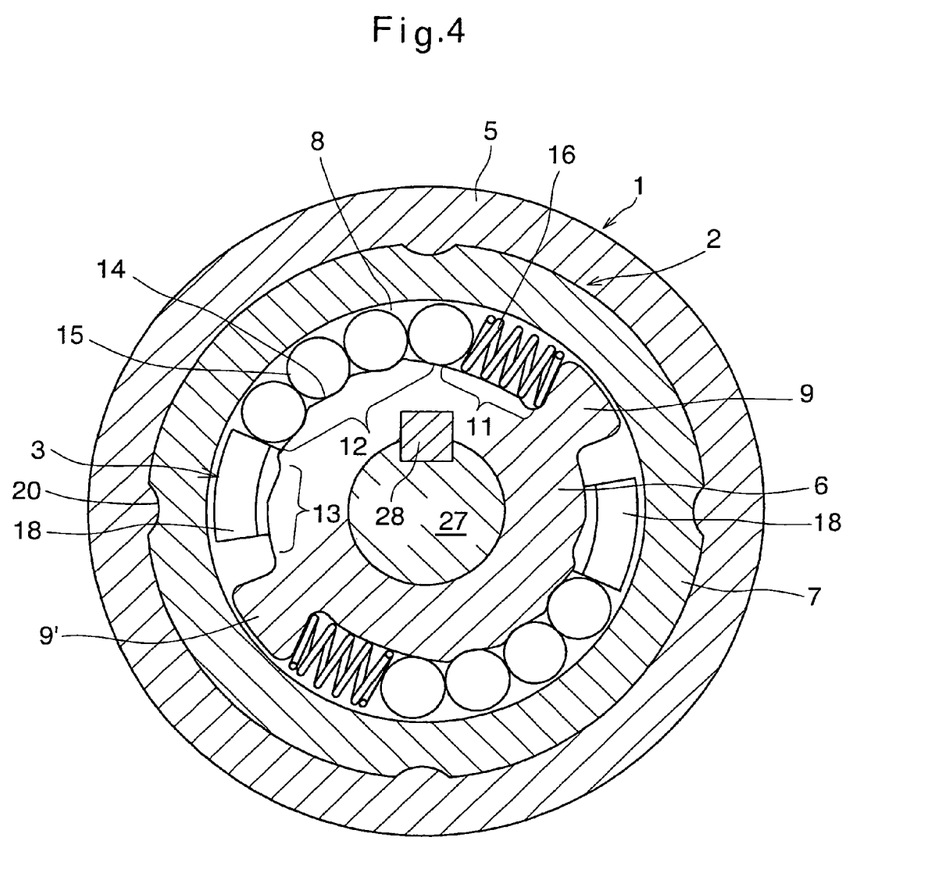
FIG. 4 is a vertical sectional front view of Embodiment 1 when the clutch is unlocked.

During the forward rotation, when the forward rotation mode is switched over to the stop mode in the control mechanism 24, the control member 23 is stopped, which in turn stops the unlocking member 3. Thus, as shown in FIG. 4, the unlocking pieces 18 push and move the rolling elements 15 toward the wide ends of the respective wedge spaces having the wedge angle θ while compressing the respective coil springs 16, thereby unlocking the clutch. Thereafter, the outer race 7 and the casing 5 keep rotating in the forward direction, while the rotary shaft 27 and the inner race 6 stop.

Torque applied to the one-way clutch 2 when the clutch is locked and unlocked is supported by the eight rolling elements 15. In conventional arrangements (see JP Patent publication 10-238560A (FIGS. 1 and 2)), torque is supported by six to seven rolling elements of the same size as the rolling elements used in the present invention. If the unlocking pieces are each received in one of the pockets, the number of rolling elements decreases further. In contrast, in Embodiment 1 of the present invention, because there are only two pockets 8, only two unlocking pieces 18 are necessary. This makes it possible to correspondingly increase the number of rolling elements 15, thus increasing the limit torque value.

In Embodiment 1, the pockets 8 of the one-way clutch 2 are formed in the radially outer surface of the inner race 6. But instead, the pockets 8 may be formed in the radially inner surface of the outer race 7.

If the casing 5 and the lid 4 are omitted, i.e. if the one-way clutch unit consists of the one-way clutch 2 and the unlocking member 3, an anti-separation means is preferably provided for preventing separation of the rolling elements 15 in the axial direction.

Embodiment 2

FIGS. 5 to 8 show Embodiment 2, which is a one-way clutch unit including an unlocking and reverse rotation mechanism. The one-way clutch unit of this embodiment includes the one-way clutch 2, unlocking member 3 and control member 23 used in Embodiment 1, and further includes a lid 4', an input member 31 and an output member 32. Because the one-way clutch 2 is identical in structure to the one-way clutch 2 of Embodiment 1, like elements are denoted by identical numerals and their description is omitted. The lid 4' and the control member 23 are disposed on the respective axial sides of the one-way clutch 2, thereby preventing axial separation of the rolling elements 15. In this embodiment, the shaft 27' is a stationary shaft.

In Embodiment 2, rotation is transmitted from outside to the outer race 7 of the one-way clutch 2. Thus, in FIG. 5, the rotation of the outer race 7 in the same direction as the forward rotation A in Embodiment 1 is indicated as forward rotation A, and the rotation in the opposite direction is indicated as reverse rotation B.

In Embodiment 2, the outer race 7 of the one-way clutch 2 is the input member 31. A gear 29 is formed on the radially outer surface of the input member 31. As in Embodiment 1, the control member 23 is formed with an engaging recess 25 and engaging portions 26 in its inner surface. The annular portion 17 of the unlocking member 3 and the bent portions of the unlocking pieces 18 are engaged in the engaging recess 25 and the engaging portions 26, respectively. The surface of the control member 23 which is in engagement with the unlocking member 3 is in contact with the end surface of the outer race 7 (FIG. 6). Another gear 34 is formed on the radially outer surface of the control member 23. On the surface of the control member 23 opposite to the abovementioned surface, four equiangularly spaced fan-shaped rotation transmission portions 36 in the form of protrusions are formed around a central hole 35 (see FIG. 7(b)). The output member 32 is provided opposite to the rotation transmission portions 36 of the control member 23.

The input member 31 and the outer race 7 may be separate members that are fitted together. But as in this embodiment, they preferably comprise a single integral part for reduced outer diameter.

A gear 37 is formed on the radially outer surface of the output member 32. On its central portion, an axially inwardly extending boss 33 is formed. Equiangularly spaced fan-shaped rotation transmission portions 38 in the form of protrusions are formed on the inner surface of the output member 32 around the boss 33. The control member 23, the one-way clutch 2, with which the unlocking member 3 is combined, and the lid 4' are fitted onto the boss 33 in this order so as to be coaxial with each other. Then, the stationary shaft 27' is inserted through the boss 33.

In this assembled state, the rotation transmission portions 36 are fitted in the respective circumferential gaps between the adjacent rotation transmission portions 38, with a predetermined gap b left therebetween (see FIG. 7(c)). Four circumferentially spaced axial ribs 39 are formed on the radially outer surface of the boss 33. Two radially elastically deformable engaging claws 41 are formed on the radially outer surface of the boss 33 at its distal end so as to be symmetrical to each other. The ribs 39 are engaged in axial anti-rotation grooves 42 formed in the radially inner surface of the inner race 6 (see FIG. 8). In this assembled state, the portion of the boss 33 formed with the engaging claws 41 protrudes outwardly from the lid 4' with the engaging claws 41 engaging the outer surface of the lid 4', thereby preventing axial separation of the lid 4' and thus integrally assembling the one-way clutch unit having the unlocking and reverse rotation function.

Having described the structure of the one-way clutch with the unlocking and reverse rotation function according to Embodiment 2, its operation is now described.

The control member 23 is controlled by a control mechanism 24 (see FIG. 6) having a control mode comprising a forward rotation mode, stop mode, and a reverse rotation mode. During the forward rotation mode, the control member 23 rotates in the forward direction, while keeping the unlocking member in the neutral position. During the stop mode, the control member 23 stops, and during the reverse rotation mode, the control member 23 rotates in the reverse direction.

During the forward rotation mode, the input member 31 (outer race 7) is rotated by the input mechanism 44. When the input member 31 is thus rotated in the forward direction A (FIG. 5), the rolling elements 15 are wedged into the respective wedge spaces having the wedge angle θ, thereby locking the clutch. In this state, the output member 32 having the integral boss 33 rotates in the forward direction together with the input member. Its rotation is then transmitted to the output mechanism through the gear 37. In this state, because the control member 23 is in the neutral position and in engagement with the output member 32 through the rotation transmission portions 36 and 38, the control member 23 rotates together with the output member 32 in the forward direction.

Figure 8:
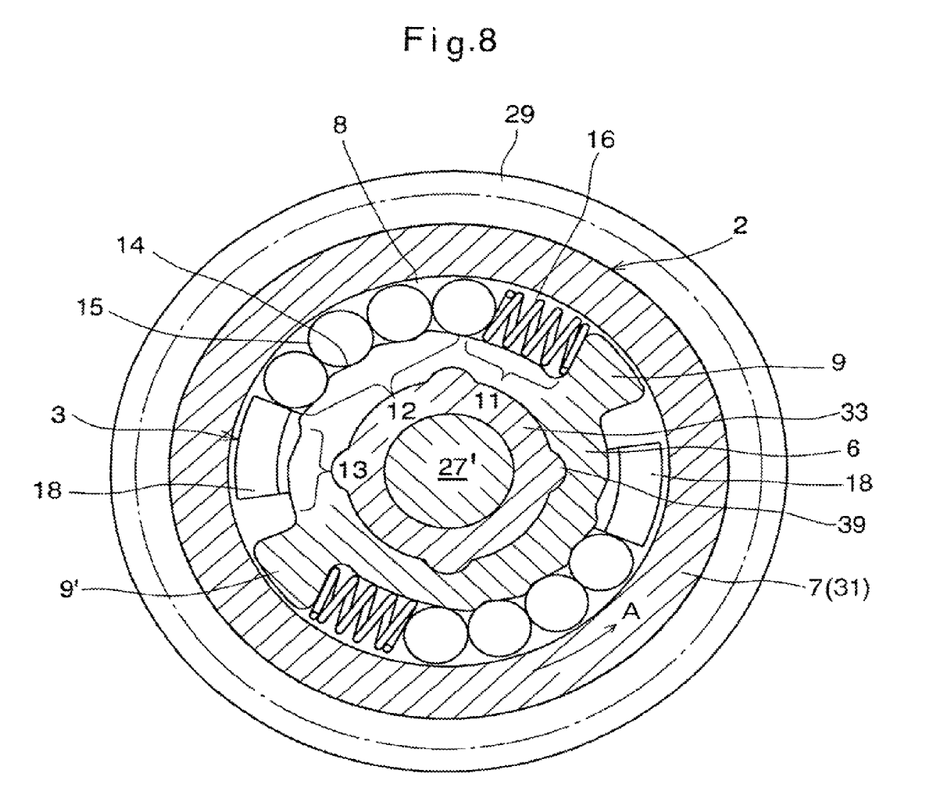
FIG. 8 is a vertical sectional front view of Embodiment 2 when the clutch is unlocked.

When the control mechanism 24 is switched over from the forward rotation mode to the stop mode, the control member 23 stops. Thus, as shown in FIG. 8, the unlocking pieces 18 push the rolling elements 15 toward the wide ends of the respective wedge spaces having the wedge angle θ while compressing the coil springs 16, thereby unlocking the clutch. This prevents transmission of torque from the input member 31, thereby stopping the inner race 6 and the output member 32, while the input member 31 (outer race 7) keeps rotating in the forward direction A.

When the control mode is switched over to the reverse rotation mode, the unlocking pieces 18 push the rolling elements 15 toward the wide ends of the respective wedge spaces having the wedge angle θ while compressing the coil springs 16, thereby unlocking the clutch. In this state, although the torque from the input member 31 is prevented from being transmitted to the output member 32, because the control member 23 is rotated in the reverse direction by the control mechanism 24, and the output member 32 is in engagement with the control member 23 through the rotation transmission portions 36 and 38, the output member 32 rotates in the reverse direction, while the input member 31 keeps rotating in the forward direction A. Thus, while the input member 31 is rotating in the forward direction, it is possible to selectively rotate the output member 31 in the forward direction, stop it, or rotate it in the reverse direction.

In this embodiment too, torque loads applied to the one-way clutch 2 are supported by the eight rolling elements 15 as in Embodiment 1.

The circumferential gaps b between the adjacent rotation transmission portions 36 and 38 serve as a backlash that prevents e.g. creaking between the rotation transmission portions 36 and 38.

What is claimed is:

1. A one-way clutch unit having an unlocking and reverse rotation function and comprising a one-way clutch (2), an unlocking member (3), an input member (31), an output member (32) and a control member (23) that are coaxially assembled together, said one-way clutch (2) comprising an inner race (6), an outer race (7) fitted around said inner race so as to be rotatable relative to said inner race, said inner race (6) having a plurality of circumferentially spaced pockets (8) formed in a fitting surface thereof, each of said pockets having a bottom formed with a circumferentially inclined cam surface (14) defining a wedge space having a predetermined wedge angle (θ) in cooperation with a fitting surface of said outer race (7), rolling elements (15) each disposed on the cam surface (14) of one of said pockets, and biasing springs (16) each received in one of said pockets (8) between a first end of said pocket that faces a wide end of the wedge space having the predetermined wedge angle (θ) and said rolling element (15) and biasing said rolling element (15) toward a narrow end of the wedge spaces having the predetermined wedge angle (θ);

wherein each of said pockets (8) has a plurality of said cam surfaces (14) that are formed continuously in the circumferential direction; wherein in each of said plurality of pockets (8), a plurality of said rolling elements (15) are received so as to be each disposed on one of said cam surfaces (14) and in contact with each other; wherein said unlocking member (3) comprises an annular portion (17) that is concentric with said inner race (6) or outer race (7), and axially extending unlocking pieces (18) each received in one of said pockets (8) between a second end of said pocket (8) that faces the narrow ends of said wedge spaces having the predetermined wedge angle and the rolling elements (15) located nearest to said second end; wherein said input member (31) and said output member (32) are fixed to said outer race (7) and said inner race (6) of said one-way clutch (2), respectively; and wherein said control member (23) and said output member (32) have rotation transmission portions (36, 38) that are in engagement with each other, thereby rotationally fixing said control member (23) and output member (32) together.

2. The one-way clutch unit of claim 1 wherein said control member (23) is controlled by an external control mechanism (24) by switching over between a forward rotation mode, a stop mode and a reverse rotation mode.

3. The one-way clutch unit of claim 2 wherein the rotation transmission portions (36) of said control member (23) are in engagement with the rotation transmission portions (38) of said output member (32) with predetermined gaps (b) defined therebetween.

4. The one-way clutch unit of claim 2 wherein said input member (31) and said outer race (7) of said one-way clutch comprise a single integral part.

5. The one-way clutch unit of claim 1 wherein the rotation transmission portions (36) of said control member (23) are in engagement with the rotation transmission portions (38) of said output member (32) with predetermined gaps (b) defined therebetween.

6. The one-way clutch unit of claim 5 wherein said input member (31) and said outer race (7) of said one-way clutch comprise a single integral part.

7. The one-way clutch unit of claim 1 wherein said input member (31) and said outer race (7) of said one-way clutch comprise a single integral part.

* * * * *